United States Patent [19]

Brüggendick et al.

[11] Patent Number: 5,330,726

[45] Date of Patent: Jul. 19, 1994

[54] DEVICE FOR THE SEPARATION OF UNDESIRED EXHAUST GAS COMPONENTS

[75] Inventors: Hermann Brüggendick, Hünxe; Karl Klinginger, Essen, both of Fed. Rep. of Germany

[73] Assignee: Steag Aktiengesellschaft, Essen, Fed. Rep. of Germany

[21] Appl. No.: 877,173

[22] PCT Filed: Nov. 30, 1990

[86] PCT No.: PCT/EP90/02057

§ 371 Date: Jun. 25, 1992

§ 102(e) Date: Jun. 25, 1992

[87] PCT Pub. No.: WO91/09672

PCT Pub. Date: Jul. 11, 1991

[30] Foreign Application Priority Data

Jan. 5, 1990 [DE] Fed. Rep. of Germany ....... 4000203

[51] Int. Cl.⁵ .................. B01D 53/06; B01D 53/34; B01J 8/08; F26B 17/12

[52] U.S. Cl. ........................ 422/177; 34/167; 34/174; 55/474; 55/479; 95/110; 95/275; 96/150; 422/213; 422/216

[58] Field of Search ............ 422/171, 177, 178, 211, 422/213, 216, 219; 34/33, 165, 167, 168, 174; 55/79, 390, 474, 479; 95/110, 275; 96/150

[56] References Cited

U.S. PATENT DOCUMENTS

| | | | |
|---|---|---|---|
| 2,882,912 | 4/1959 | Reeg et al. | 422/216 X |
| 4,308,669 | 1/1982 | Noyes et al. | 34/133 |
| 4,441,898 | 4/1984 | Revell | 55/390 |
| 4,712,311 | 12/1987 | Peifer | 34/168 |
| 4,784,836 | 11/1988 | Karlsson et al. | 422/233 |
| 5,169,607 | 12/1992 | Krambrock et al. | 422/216 |

FOREIGN PATENT DOCUMENTS

| | | |
|---|---|---|
| 3732567 | 9/1987 | Fed. Rep. of Germany . |
| 3818911 | 6/1988 | Fed. Rep. of Germany . |
| 2116869 | 10/1983 | United Kingdom . |

Primary Examiner—Robert J. Warden
Assistant Examiner—L. M. Crawford
Attorney, Agent, or Firm—Robert W. Becker & Associates

[57] ABSTRACT

A device for separating undesired exhaust gas components from a fluid comprises a reactor with a reaction chamber and having a top and a bottom. The top has a device for introducing a granular adsorption medium. The bottom comprises first and second oppositely slanted sidewalls arranged parallel to one another and forming between them a gutter open in an upward direction. Sections of the gutter form removal funnels with a funnel mouth for removing the granular adsorption medium. The bottom further has fluid inflow openings for admitting the fluid into the reaction chamber, whereby the funnel mouths and the fluid inflow openings are arranged alternatingly in the gutters. The funnel mouths are arranged to form a grid structure. The bottom also has distributing elements for covering the fluid inflow openings. The distributing elements have a pyramid, a cone, a pyramid sector, or a cone sector shape. The distributing elements have lower edges that are vertically spaced at least with portions thereof from the oppositely slanted sidewalls for forming the fluid inflow openings.

15 Claims, 4 Drawing Sheets

DEVICE FOR THE SEPARATION OF UNDESIRED EXHAUST GAS COMPONENTS

BACKGROUND OF THE INVENTION

The invention relates to an adsorption device for separating undesired components from a fluid, especially exhaust gas, having a reactor delimiting a reaction chamber, which at the top is provided with an introduction means and at the bottom with a floor consisting of grid-like arranged removal funnels for introducing and removing a granular adsorption medium, whereby in the floor fluid inflow openings are provided which are covered by distributing elements via which the fluid is introduced from the bottom into the reaction chamber.

Such adsorption devices are commonly operated as counterflow reactors whereby the usually granular adsorption medium is removed below the floor in a downward direction continuously or intermittently and, corresponding to this removal, the adsorption medium column moves downwardly. The fluid to be treated is guided through the reaction chamber counter to the transportation direction of the adsorption medium. In order to achieve a high degree of reaction efficiency, it is important that the fluid flows through the adsorption medium column at a uniform rate and that the granular adsorption medium is provided with uniform moving conditions within the reaction chamber.

From German Offenlegungsschrift 37 32 567 a flow bottom for moving bed reactors is known which supposedly ensures a good inflow distribution of the fluid and uniform removal properties of the flowable adsorption medium. This known flow bottom is provided with removal funnels for the flowable bulk material that are arranged in a honeycomb fashion adjacent and behind one another, whereby in the side walls through openings for the fluid are provided. Above each through opening a roof-shaped distributing element for the fluid is arranged such that it spans the funnel from one wall to the other in a bridge-like manner.

The invention solves the problem of providing a uniform inflow and through flow of the fluid to be treated through the adsorption medium bed and a uniform and disruption-free removal of the adsorption medium through the absorber floor with especially simple constructive means.

SUMMARY OF THE INVENTION

In the adsorption device of the aforementioned kind this object is inventively solved by forming a gutter or trough which is open to the top between oppositely slanted walls of the floor, in which alternatingly fluid inflow openings and funnel mouths are arranged, and in which each distributing element is provided in the shape of a pyramid hood, a cone hood, a pyramid sector hood, or a cone sector hood, the lower edges of which at least with portions thereof are vertically spaced from the oppositely slanted side walls of the floor for forming the fluid inflow openings.

The device of the present invention for separating undesired exhaust gas components from a fluid primarily characterized by:

a reactor with a reaction chamber and having a top and a bottom;

the top having a means for introducing a granular adsorption medium;

the bottom comprising first and second oppositely slanted sidewalls arranged parallel to one another and forming between each first and second sidewalls a gutter open in a direction toward the top, with sections of the gutter forming removal funnels, each having a funnel mouth, for removing the granular adsorption medium;

the bottom further having fluid inflow openings for admitting the fluid into the reaction chamber, the funnel mouths and the fluid inflow openings arranged alternatingly in the gutters, wherein the funnel mouths are arranged to form a grid structure; and the bottom further having distributing elements for covering the fluid inflow openings, the distributing elements having a shape selected from the group consisting of a pyramid, a cone, a pyramid sector, and a cone sector, the distributing elements having lower edges that are vertically spaced at least with portions thereof from the oppositely slanted sidewalls for forming the fluid inflow openings.

Preferably, each distributing element has maximum cross-sectional dimensions in a direction of the longitudinal extension of the gutter or transverse thereto.

Advantageously, each funnel mouth is partially overlapped by distributing elements adjacent to the funnel mouth.

Expediently, the device further comprises an inflow channel having a rectangular cross-section, and the distributing elements have the shape of a pyramid or pyramid sector, with two opposite corners of the base of the pyramid or pyramid sector aligned with a centerliner of the gutter, the inflow channel axially aligned with the tip of the pyramid or pyramid sector.

The inflow channels are preferably in the form of chimneys extending in an upward direction from a center line of the gutters past the oppositely slanted sidewalls that define the removal funnels. The chimney has vertically extending edges, with two oppositely arranged vertically extending edges bordering at the funnel mouths of two neighboring ones of the removal funnels.

The gutters have a roof-shaped cross-sectional contour and two neighboring gutters are delimited by a common ridge.

The device further comprises transverse sidewalls extending transverse to the oppositely slanted sidewalls and bordering at the chimneys and slanted downwardly toward the funnel mouths. The transverse sidewalls together with the chimneys divide the gutters into the sections, wherein each section has one of the removal funnels with one of the funnel mouths centrally arranged relative to the removal funnel. The transverse walls of neighboring sections converge to form upper ridges. The upper ridges are arranged on a same horizontal level, the horizontal level being lower than or identical to a level of the common ridges of the gutters.

The device further comprises vertically extending removal channels connected to the funnel mouths having a cross-section that is substantially smaller than a cross-section of the fluid inflow openings. The removal channels have a bottom opening.

The device further comprises an intermediate storage floor with a lateral outlet opening, the intermediate storage floor spaced at a distance from the bottom openings, and a removal rake, the removal rake comprising at least one pivot bearing for pivotably supporting the removal rake, the removal rake inserted into a space between the intermediate storage floor and the bottom openings with play for transporting, transverse to a direction of flow of the adsorption medium, the adsorption medium collected on the intermediate storage floor to the lateral outlet opening. The removal rake further comprises a crank gear.

In the inventive adsorption device the fluid exiting from one of the fluid inflow openings is annularly and uniformly distributed onto the surrounding adsorption medium and removed by two adjacent removal funnels. Accordingly, optimal distributing characteristics over the cross-section of the adsorption medium result within the funnel area as well as within the adsorption medium bed arranged above. The preferably pyramid-shaped hood of each distributing element itself forms walls which separate the flowable adsorption medium to two sides into two funnels arranged between a pair of oppositely slanted gutter side walls. They support accordingly the funnel effect above the funnel mouths. Due to this double function of the hoods, the number of insert elements forming the floor may be minimized. In spite of this, the free fluid inflow cross-sections usable for the fluid inlet into the adsorption medium bed are comparatively large and uniformly distributed over the entire reactor bottom. Furthermore, the constructive height of the bottom portion may be kept at a minimum.

Preferably, the hood has maximum cross-sectional dimensions in the direction of the longitudinal extension of the gutter or trough and/or transverse to the longitudinal direction, whereby two neighboring hoods cover partially the intermediate funnel mouths. This embodiment allows the fluid to flow into the reaction chamber essentially over the entire circumference of the hood without disruptions.

In a preferred embodiment of the invention an inflow channel opening into a fluid inflow opening is arranged under each hood. The inflow channel, within the area of the fluid inflow opening, has a large opening contour for introducing the fluid into the flowable bulk material cones below the hood and has thus a low flow resistance.

The lower ends of the removal channels are provided with means for a metered removal of the adsorption medium. According to a particular aspect of the present invention, these removal means are in the form of a removal rake which is supported at at least one pivot bearing in a pivotable manner and which removes adsorption medium collected on an intermediate storage floor arranged below the bottom openings to the side into an outlet opening. The pivot bearings of the removal rake may be arranged at the reactor housing, at the counterflow bottom, or at a special support frame. As a drive means for the removal rake a crank gear is especially suited.

BRIEF DESCRIPTION OF THE DRAWINGS

In the following, the invention will be explained in detail with the exemplary embodiments represented in the drawing. The drawing shows.

DESCRIPTION OF PREFERRED EMBODIMENTS

Figure 1:
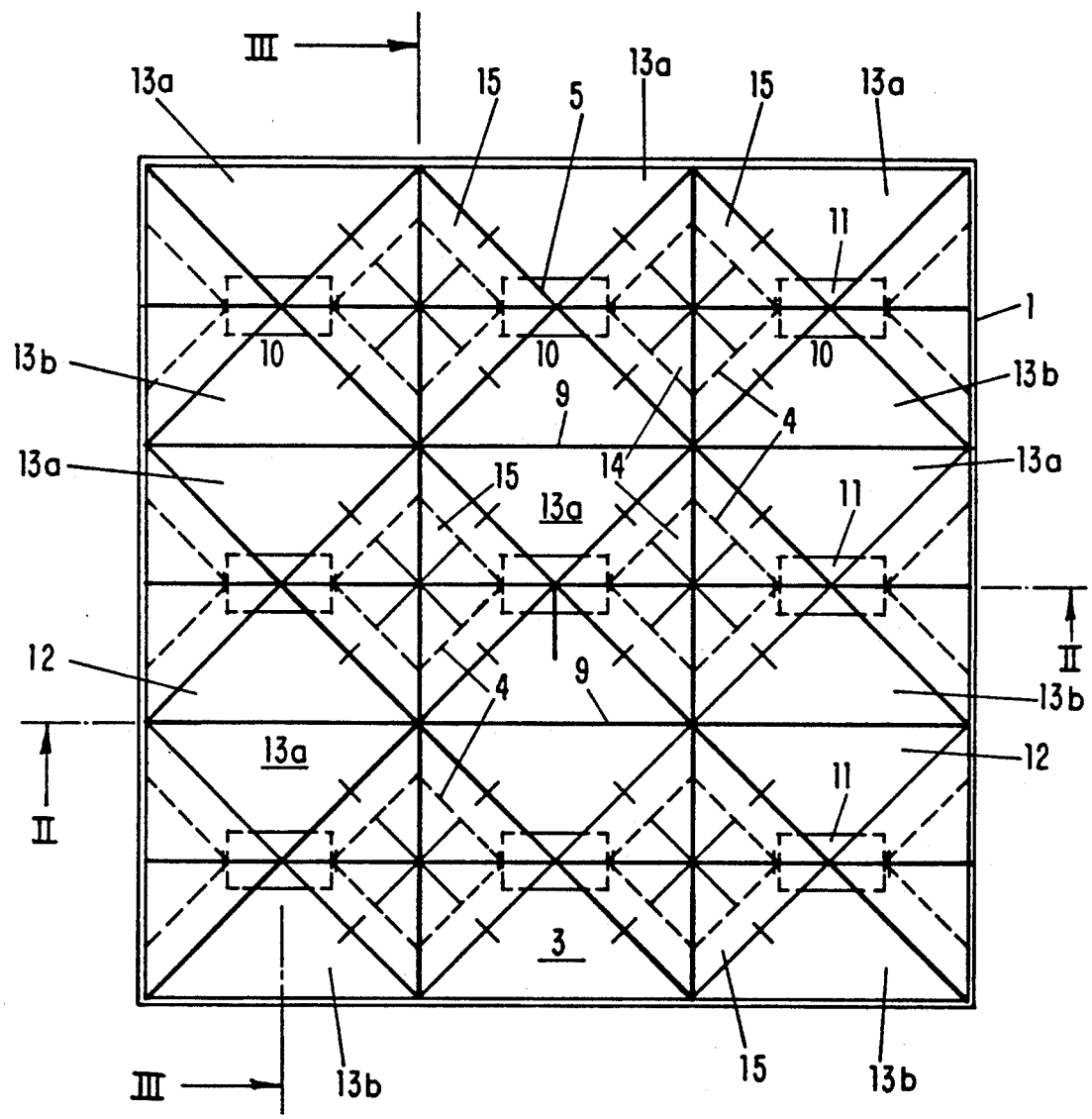
FIG. 1 a schematic top view into the reaction chamber and onto the reactor bottom of a counterflow adsorption device according to the present invention.

Only the lower portion of the adsorption device is shown in the drawing. The adsorption device comprises a reactor housing 1 with a reaction chamber .2, a reactor bottom, respectively, a counterflow bottom 3, chimney-type inflow channels 4, removal channels 5, and an outlet 6. The top portion 1a of the reactor and the corresponding introduction device 1b for the flowable adsorption medium 8 may be of a known design.

During the operation the adsorption medium 8, flows continuously or intermittently under the force of gravity into the reaction chamber 2 from the top to the bottom, is guided at the reactor bottom 3 via funnels 10 into the mouths 11 and from there through the removal channels 5 into the outlet 6.

Of special importance for the invention is the embodiment of the reactor bottom 3, through which the fluid to be treated is essentially guided in a uniform distribution counter to the moving direction of the flowable adsorption medium 8 through the reaction chamber and the adsorption medium moving within the reaction chamber. The reactor bottom 3, as can be seen best in FIG. 1, is provided with funnels in a rectangular grid structure. A funnel row is formed within a gutter or trough 12 that is open to the top (FIG. 3), whereby the gutter or trough is comprised of two oppositely slanted side walls 13a and 13b. Two neighboring trough 12 are separated from one another by a ridge 9 which is formed by the oppositely slanted walls 13b and 13a. In each trough 12 funnel mouths 11 (for removal of the adsorption medium) and fluid inflow openings 14 are arranged in a uniform grid. Each fluid inflow opening 14 is covered by a fluid distributing element in the form of a pyramid-, respectively, pyramid sector-shaped hood 15. Each distributing hood 15 outwardly overhangs the fluid inflow opening 14 such that between the lower edge 16 of the hood 15 and the mouth of the inflow channel 4 delimiting the fluid inflow opening 14 a efficiently large free annular space is created through which the fluid flows into the surrounding adsorption medium. Two sector walls of each pyramid-shaped hood 15 are coordinated with a funnel 10, the two other sector walls are coordinated with the neighboring funnel 10 within a trough 12. The pyramid sector walls are arranged at a distance above the side walls 13a and 13b so that adsorption medium sliding downwardly on the pyramid sector walls is guided onto the slanted gutter side walls 13a and 13b and from there farther in the direction to the mouths 11. This forced channeling of the adsorption medium into the area of the respective funnel mouth is accompanied by the uniform distribution of the fluid to be treated along the hood circumference, respectively, along the lower edge 16. The fluid is thus guided from each fluid inflow opening 14 into the areas of two neighboring funnels 10 and is guided from there counter to the moving direction of the adsorption medium through the adsorption medium bed within the reaction chamber 2 and uniformly distributed profile in an upward direction via its cross-sectional profile.

Figure 2:
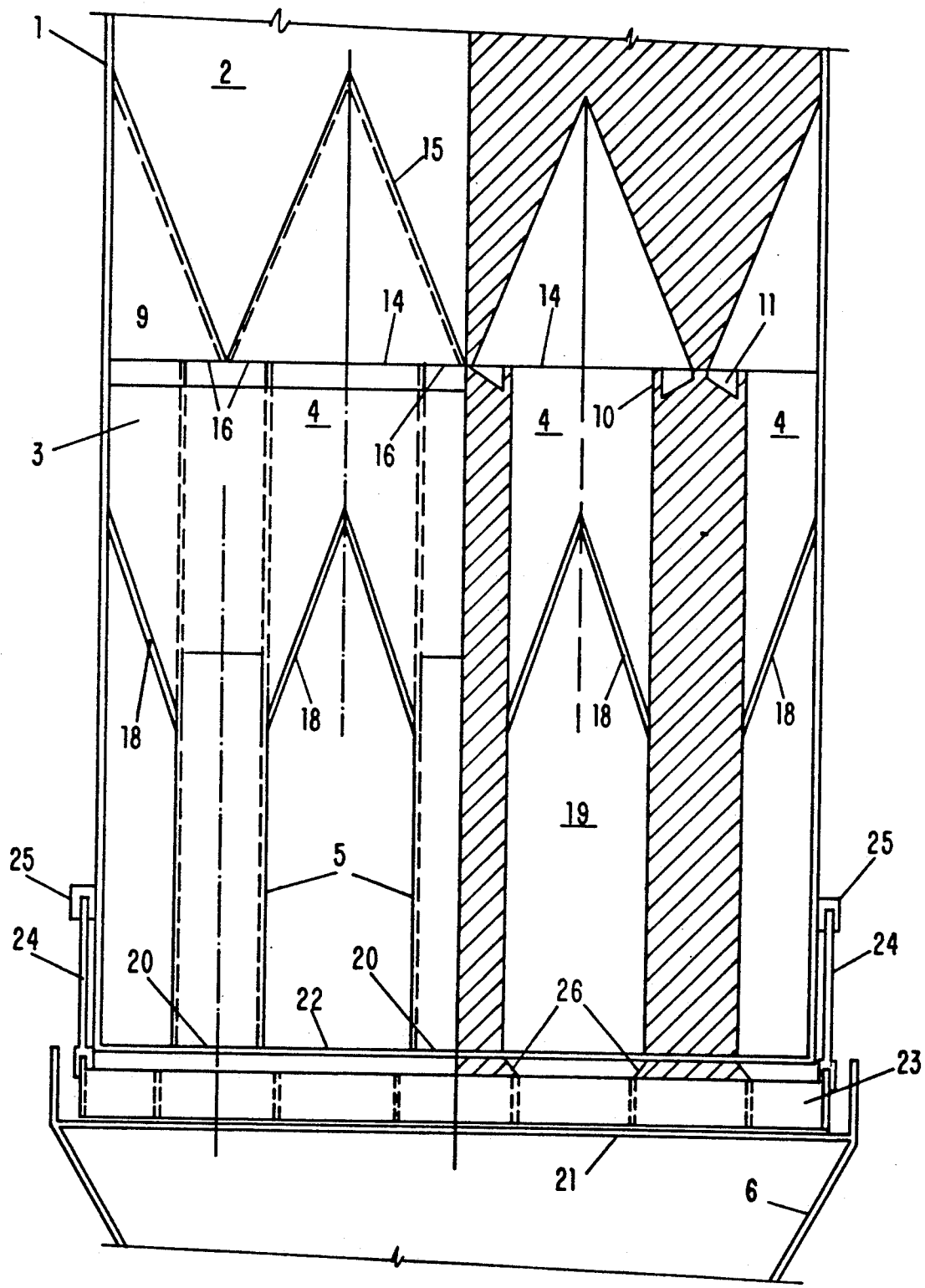
FIG. 2 is a cross-sectional view along the stepped section line II—II in FIG. 1, limited to the lower section of the reactor with the reactor bottom, the adsorption medium removal device and the fluid inflow channels, whereby the partial section on the right shows the adsorption medium filling.
Figure 3:
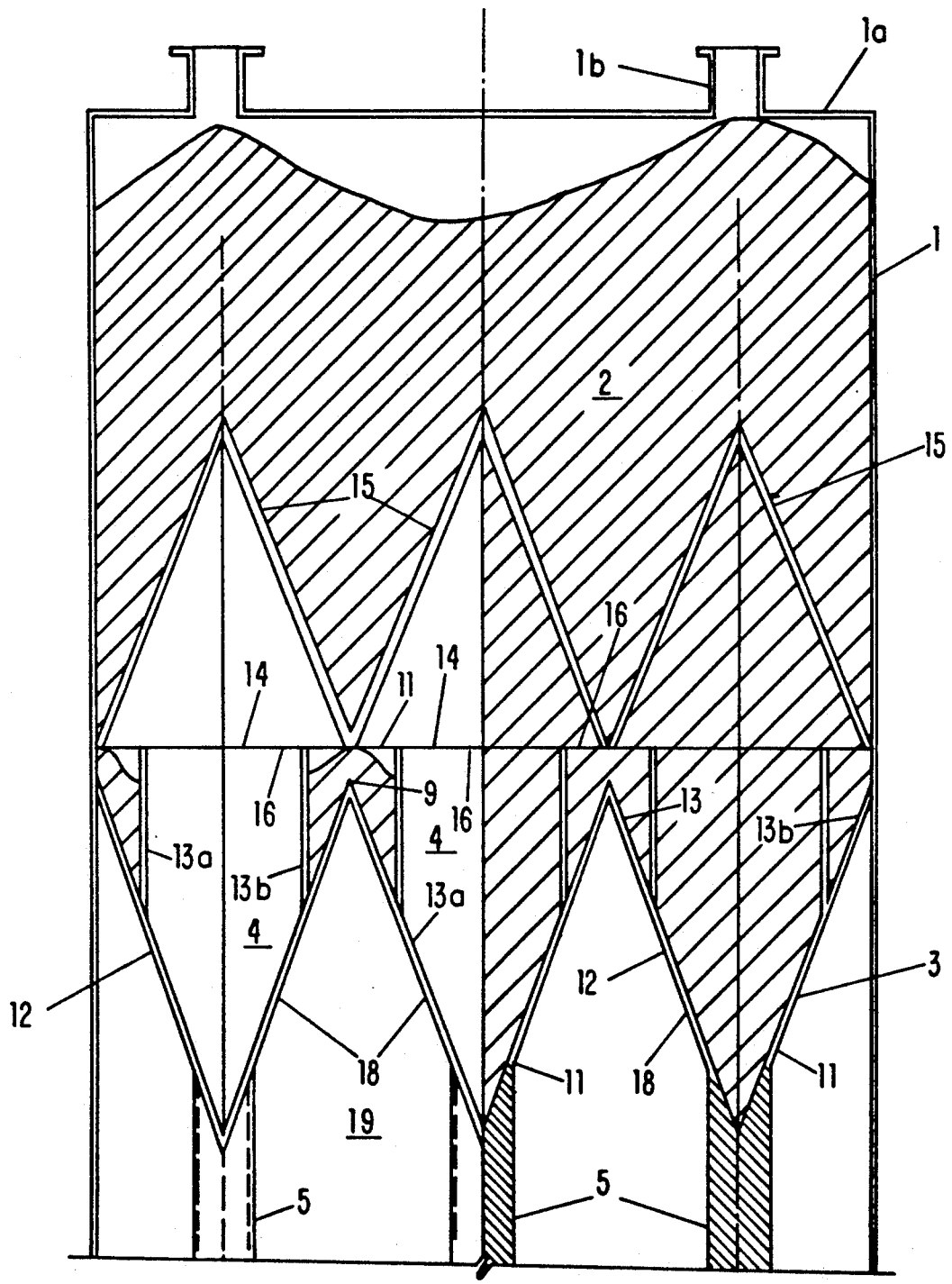
FIG. 3 is a cross-sectional view along the section line III—III in FIG. 1 of the device portion represented in FIG. 2.

According to the embodiment of FIGS. 1 to 3, each inflow channel 4 is provided in the form of a chimney with a square cross-section, which is inserted in a saddle-like manner between the slanted side walls 13a and 13b of a trough 12. The bottom edges 18 of the chimney 5 that end with the slanted side walls 13a and 13b converge downwardly on the axis of the gutter in a V-shape. At the lower end, each chimney type inflow channel, 4 opens into a common gas space 19.

The removal channels 5 for the adsorption medium have each a respective vertical central axis. Its inlet forms a respective funnel mouth 11. The mouth 11, as can be seen in FIGS. 1 and the right half of FIG. 2, abuts directly at a corner of the two neighboring inflow channels 4. Accordingly, all flow portions of the adsorption medium within the area of the funnel 10 are directed to the inlet of each removal channel 5, and material blockage or dead zones are reliably prevented.

All removal channels have bottom openings 20 (FIG. 2) in the plane of an end plate 22 which delimits the gas space 19 in a downward direction. The flowable adsorption medium which exits from these bottom openings collects at the horizontal sections of the intermediate storage floor 21. In the horizontal space between the intermediate storage floor 21 and the end plate 22 a removal rake 23 is provided. The removal rake is supported via pivot arms 24 at pivot bearings 25. The removal rake is provided with blades, which according to the almost horizontal movement play of the rake 23 within the space between the floors 21 and 22 move the collected adsorption medium cones 26 into the outlet openings between neighboring intermediate storage floor sections. The adsorption medium which falls through the outlet openings is removed via the funnel-shaped outlet 6. From this results a metered removal of the adsorption medium from the removal channels 5, respectively, through the reactor bottom 3 due to the working cycle and the transport amount of the rake 23. This pendulum-type rake embodiment does not require roller or friction bearings which are subject to wear. The drive of the rake preferably is achieved by a suitable crank gear or a horizontally acting piston-cylinder drive which engages directly or indirectly the rake.

Figure 4:
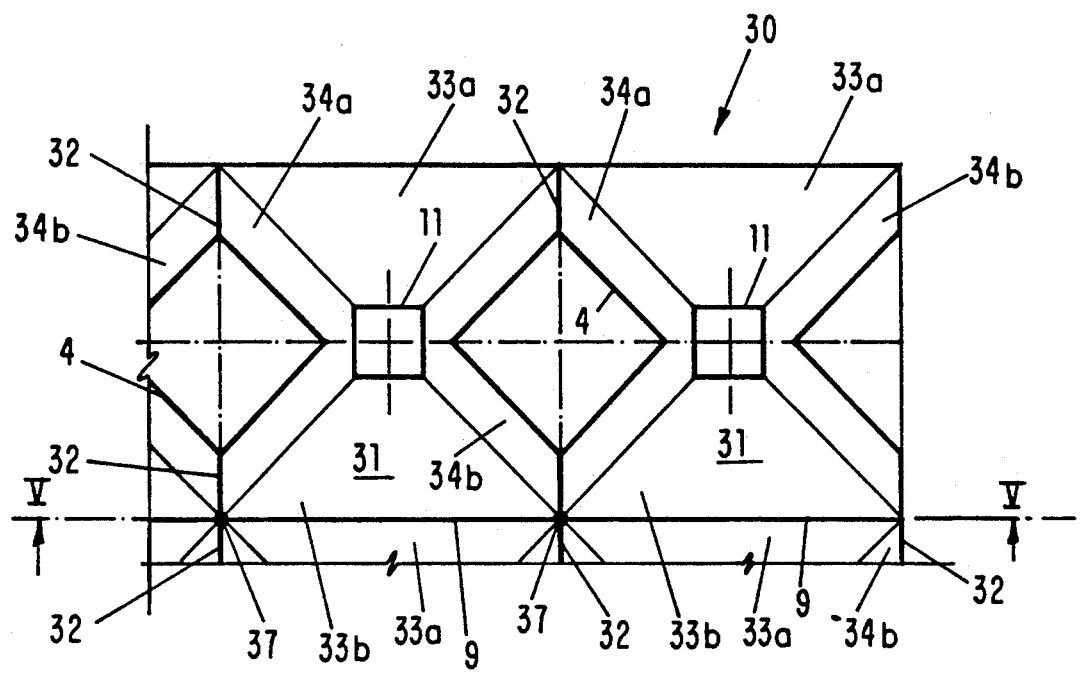
FIG. 4 is a plan view of a modified embodiment of the reactor bottom with funnel-shaped base elements.
Figure 5:
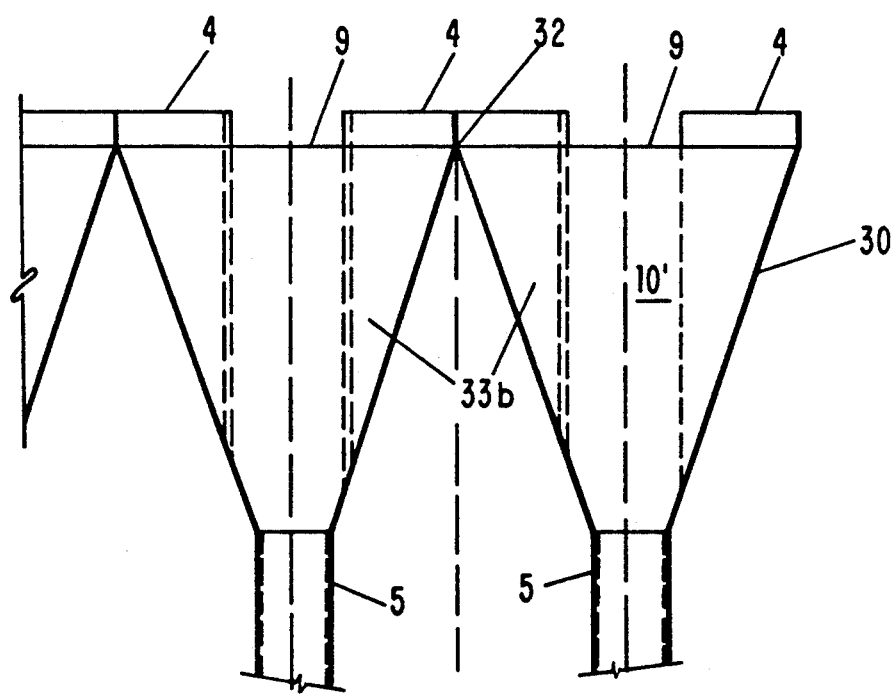
FIG. 5 is a cross-sectional view along the line V—V in FIG. 4.

In the FIGS. 4 and 5 a partial representation of an alternative embodiment of a reactor, respectively, counter flow bottom 30 is shown. The representations are similar to the representations of FIGS. 1 and 2 whereby, however, in FIG. 4 the pyramid-shaped distributing elements are not shown. The embodiment corresponding to FIGS. 4 and 5 differs from the afore-described embodiment primarily in that the gutters are divided by transverse ridges 32 into gutter sections 31. Each square gutter section has a funnel 10' which is delimited by four wedge surfaces that are slanted towards the mouth 11. The arrays of the two wedge surfaces 33a and 33b correspond to the slanted side walls 13a and 13b of the afore-described embodiment; the wedge surfaces 34a and 34b arranged transverse to the gutter extension have triangular cutouts corresponding to the bordering chimney contours of the inflow channels 4. In this embodiment the two wedge surface pairs 33a, 33b and 34a, 34b provide for a transport angle directed toward the opening and essentially identical at all surfaces. The wedge surfaces 33, 34 which delimit the individual funnels 32 end at their upper portion in ridges 9, respectively, 32. The ridges 9 and 32 which extend at a right angle relative to one another are arranged within a plane which is parallel to the drawing plane of FIG. 1 in this particular embodiment.

The embodiment according to FIGS. 4 and 5 has the advantage of a particularly favorable flow characteristic of the adsorption medium within the area of the reactor bottom, especially in the areas directly adjacent to the inflow channels on the cutout wedge surfaces 34a and 34b. On the other hand, the embodiment according to the first example (FIGS. 1 to 3) has the advantage of a constructively especially simple embodiment because the slanted wedge surfaces 34a and 34b are omitted and the slanted side walls 13a and 13b extend continuously over the different funnel elements within the reactor bottom. In the embodiment according to FIGS. 4 and 5, as mentioned above, the slanted side walls are reduced to short stays or points at the intersections 37.

Between these two extreme embodiments a plurality of variations is possible which differ primarily in that the ridge 32 relative to the ridge 9 and/or is arranged at a lower level so that, on the one hand, the slanted side walls 13a and 13b continuously extend from the left to the right bottom end and, on the other hand, the side walls corresponding to the wedge surfaces 34 adjacent to the inflow channels 4 are incorporated into the bottom.

The slant of the pyramid-shaped hoods, respectively, distributing elements 15 as well as of the slanted side walls 13a, 13b, respectively, 33a, b and 34a, b depends on the flow characteristics of the flowable adsorption medium to be transported under the force of gravity via the side walls. On the one hand, the adsorption medium must flow over the walls of the funnel and the walls of the distributing elements without disturbance and, on the other hand, comparatively small slant angles are preferable in order to minimize the vertical dimension of the bottom.

The present invention is, of course, in no way restricted to the specific disclosure of the specification and drawings, but also encompasses any modifications within the scope of the appended claims.

What we claim is:

1. A device for separating undesired exhaust gas components from a fluid, said device comprising:
   a reactor with a reaction chamber, said reactor having a top and a bottom;
   said top having a means for introducing a granular adsorption medium;
   said bottom comprising first and second oppositely slanted sidewalls arranged with longitudinal extensions thereof parallel to one another and forming between each of said first and second sidewalls a trough open in a direction toward said top, said trough having removal funnels, each having a funnel mouth, for removing the granular adsorption medium;
   said bottom further having fluid inflow openings for admitting a fluid into said reaction chamber, said funnel mouths and said fluid inflow openings arranged alternatingly in said troughs, wherein said funnel mouths of neighboring ones of said troughs are arranged to from a grid structure; and
   said bottom further having distributing elements for covering said fluid inflow openings positioned above said fluid inflow openings, said distributing elements having a shape selected from the group consisting of a pyramid, a cone, a pyramid sector, and a cone sector, said distributing elements having lower edges that are spaced in the vertical direction at least with portions of said lower edges from said oppositely slanted sidewalls for delimiting said fluid inflow openings.

2. A device according to claim 1, wherein each said distributing element is arranged such that a largest dimension of a cross-section of said distributing element is aligned with a longitudinal direction of said trough.

3. A device according to claim 1, wherein each said distributing element is arranged such that a largest dimension of a cross-sectional of said distributing element is traverse to a longitudinal direction of said trough.

4. A device according to claim 1, wherein each said funnel mouth is partially covered by said distributing element adapted to said funnel mouth.

5. A device according to claim 1, further comprising an inflow channel having a rectangular cross-section, and wherein said distributing element shave a shape of a pyramid or pyramid sector, with two opposite corners of a base of the pyramid or pyramid sector horizontally aligned with a centerline of said trough, said inflow channel axially aligned with the tip of the pyramid or pyramid sector.

6. A device according to claim 5, wherein said inflow channels extend in an upward direction from a center line of said trough past said oppositely slanted sidewalls that define said removal funnels.

7. A device according to claim 6, wherein said channel has vertically extending edges and wherein two oppositely arranged ones of said vertically extending edges border at said funnel mouths of two neighboring ones of said removal funnels.

8. A device according to claim 5, wherein said troughs have a roof-shaped cross-sectional contour and two neighboring ones of said troughs are delimited by a common ridge.

9. A device according to claim 8, further comprising transverse sidewalls extending transverse to said oppositely slanted sidewalls, said traverse sidewalls bordering at said channels and slanted downwardly toward said funnel mouths.

10. A device according to claim 9, wherein between two neighboring said channels together with corresponding said transverse sidewalls a section of said trough is defined, wherein each said section has one of said removal funnels with one of said funnel mouths centrally arranged relative to said removal funnel.

11. A device according to claim 10, wherein said transverse walls of neighboring ones of said sections converge to form upper ridges.

12. A device according to claim 11, wherein said upper ridges are arranged on a same horizontal level, said horizontal level being lower than a level of said common ridges of said gutters.

13. A device according to claim 11, wherein said upper ridges are arranged on a same horizontal level, said horizontal level being identical to a level of said common ridges of said gutters.

14. A device according to claim 1, further comprising vertically extending removal channels connected to said funnel mouths and having a cross-sectional area that is substantially smaller than a cross-sectional area of said fluid inflow openings.

15. A device according to claim 14, wherein said removal channels have a bottom opening, and wherein said device further comprises an intermediate storage floor with a lateral outlet opening, said intermediate storage floor spaced at a distance from said bottom openings, and a removal rake, said removal rake comprising at least one pivot bearing for pivotably supporting said removal rake, said removal rake inserted with play into a space between said intermediate storage floor and said bottom openings for transporting, transverse to a direction of flow of the adsorption medium, the adsorption medium collected on said intermediate storage floor to said lateral outlet opening.

* * * * *